United States Patent [19]
Stephanson et al.

[11] Patent Number: 6,108,325
[45] Date of Patent: Aug. 22, 2000

[54] OPTIMIZED SMS DELIVERY ALGORITHM

[75] Inventors: Stephan Daniel James Stephanson, Ottawa; William Edward Illidge, Kanata; Warren Richard Morris, Nepean, all of Canada

[73] Assignee: Nortel Networks Corporation, Montreal, Canada

[21] Appl. No.: 08/987,766

[22] Filed: Dec. 9, 1997

[51] Int. Cl.$^7$ ................................................... H04B 7/212
[52] U.S. Cl. ............................................ 370/337; 370/347
[58] Field of Search ..................................... 370/328, 330, 370/337, 347, 349, 432; 455/433, 466; 340/311.1

[56] References Cited

U.S. PATENT DOCUMENTS

5,625,629  4/1997  Wenk ........................................ 370/347
5,628,051  5/1997  Salin ........................................ 455/33.1
5,642,356  6/1997  Wenk ........................................ 370/337
5,666,107  9/1997  Lockhart et al. ....................... 340/827

*Primary Examiner*—Huy D. Vu
*Assistant Examiner*—Alexander Boakye

[57] ABSTRACT

A system and method for delivering short messages to idle mobile stations which conserves paging channel capacity. A normal page is first sent to all cells to locate the mobile station to which the short message is addressed. When the mobile station is located, the full short message is sent over the paging channel for the single cell in which the mobile station is located if the length of the short message is determined to be suitable for sending over the paging channel. If the short message is too long, then a traffic channel is established to the mobile station, and the message is sent over the traffic channel.

14 Claims, 6 Drawing Sheets

MC Flowchart

FIG. 5

FIG. 6

OPTIMIZED SMS DELIVERY ALGORITHM

FIELD OF THE INVENTION

The invention relates to a system and method for delivering short messages to mobile stations which are not currently involved in a call.

BACKGROUND OF THE INVENTION

A recent development in mobile cellular systems is the ability to transfer short messages between an application residing on a mobile station and another application residing on a mobile network element, such as a message centre for example. This service is sometimes referred to as a SMS (short message service). These messages might include mobile originated point-to-point messages, mobile terminated point-to-point, and broadcast for example. These messages, while short, are typically much longer than a conventional page.

The conventional approach to short message delivery to an idle mobile station is to flood all the paging channels with the message. A problem with this approach is that a lot of paging bandwidth is needlessly wasted. Because of this, this conventional approach is biased towards smaller SMS message payloads and requires more messaging to deliver large payloads. With the industry moving more and more towards data services, is would be advantageous to have a short message service capable of efficiently delivering longer messages.

There is no problem with sending messages to mobile stations which have an active traffic channel since the messages can also be sent over the traffic channel without wasting any additional paging channel resources. However, it is undesirable to set up a traffic channel specifically for sending a message unless this is absolutely necessary. This is because the traffic channels are the main revenue generating units for the mobile network and need to be conserved.

SUMMARY OF THE INVENTION

It is an object of the invention to obviate or mitigate one or more of the above identified disadvantages.

According to a first broad aspect, the invention provides a system for delivering a short message addressed to a particular mobile station comprising: a message centre initially having access to the short message; a mobile switching centre in communication with the message centre; a plurality of basestation controllers connected to the mobile switching centre, each providing mobile communications service to a respective number of cells, each cell having a paging channel; wherein the short message is sent by the message centre to the mobile switching centre which broadcasts a page to all of the cells so as to determine the cell in which is located the mobile station to which the short message is addressed, and after determining the cell, the mobile switching centre passes the short message to the basestation controller for that cell, and the basestation controller for that cell transmits the short message to the mobile station.

According to a second broad aspect, the invention provides a method of delivering a short message to a mobile station in a system comprising a message centre, a mobile switching centre controlling a plurality of basestation controllers, each basestation controller having a respective number of cells, each cell having a paging channel, the method comprising: the message centre sending the message to the mobile switching centre; the mobile switching centre broadcasting a page through all basestation controllers under its control; a particular basestation controller receiving a response from the mobile station and sending a page response to the mobile switching centre indicating the particular cell in which the mobile station is located; the mobile switching centre sending the short message to the particular basestation controller; the particular basestation controller sending the short message to the mobile station.

According to a third broad aspect, the invention provides a mobile switching centre method comprising the steps of: receiving a short message including an address of a mobile station to which the short message is addressed; sending a page to its entire service area; receiving a message in response to the page indicating a cell in which the mobile station is located; sending the short message to a basestation serving the cell.

By using a "page first" methodology to deliver short messages to a mobile station that is not currently on a call, better utilization of the paging channel may be achieved, and un-needed call setups and unnecessary traffic channel usage are avoided. By sending the message payload only to the cell in which the mobile station is located, an increased degree of privacy results.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

Figure 1:
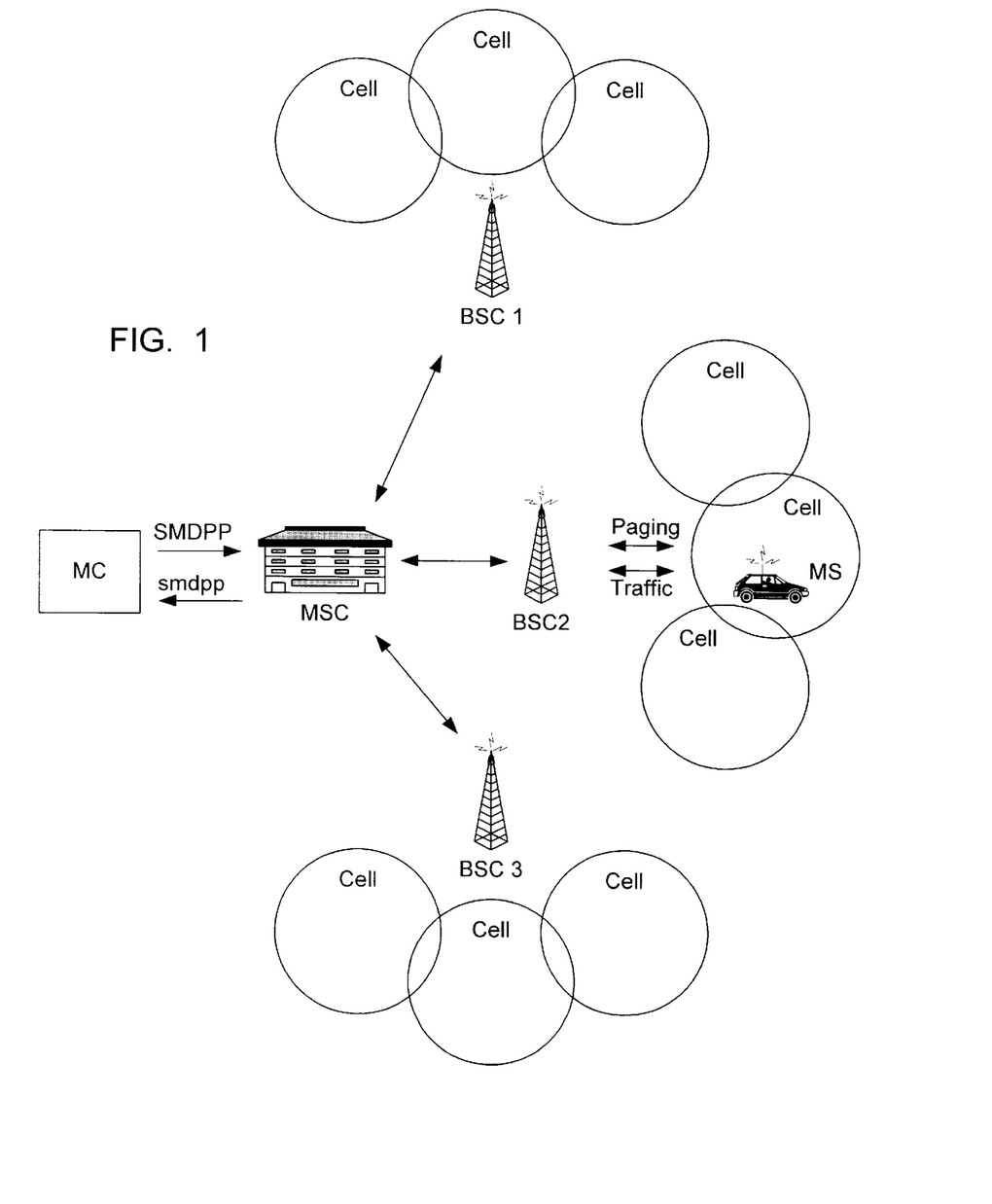
FIG. 1 is a schematic diagram for a simple cellular network.

Referring firstly to FIG. 1, a simple cellular network for implementing a SMS (short messaging service) according to an embodiment of the invention includes a MC (message centre) connected to a MSC (mobile switching centre). The MSC is connected to a number of basestation controllers BSC1, BSC2, BSC3 each of which control a respective set of basestations (not shown) within a number of cells. In the illustrated embodiment each of three basestation controllers is controlling three cells respectively. A MS (mobile station) is shown operating within one of the cells being controlled by BSC2.

Any message communications between a particular BSC and a MS in a cell controlled by the particular BSC will be of course routed through the relevant basestation located in the cell. The details of the basestation involvement are not essential to this embodiment of the invention. As such, in what follows, when a message is said to be sent from a BSC to or from an MS, it is assumed to be sent from the BSC to the basestation, and from the basestation to the MS, and vice versa. The basestation to MS communications are done over the air interface.

By way of overview, according to the invention the first step in delivering any SMS message to the MS is to page it and thereby locate it. If and when the mobile station responds, it returns its location and possibly its paging channel capacity. The MSC decides on the basis of the mobile station's response whether to complete the delivery on the paging channel or on a traffic channel. If the message will fit on the paging channel it is delivered directly to the mobile station's cell via the paging channel. Otherwise, a traffic channel is established and the message is delivered over the traffic channel.

Figure 2:
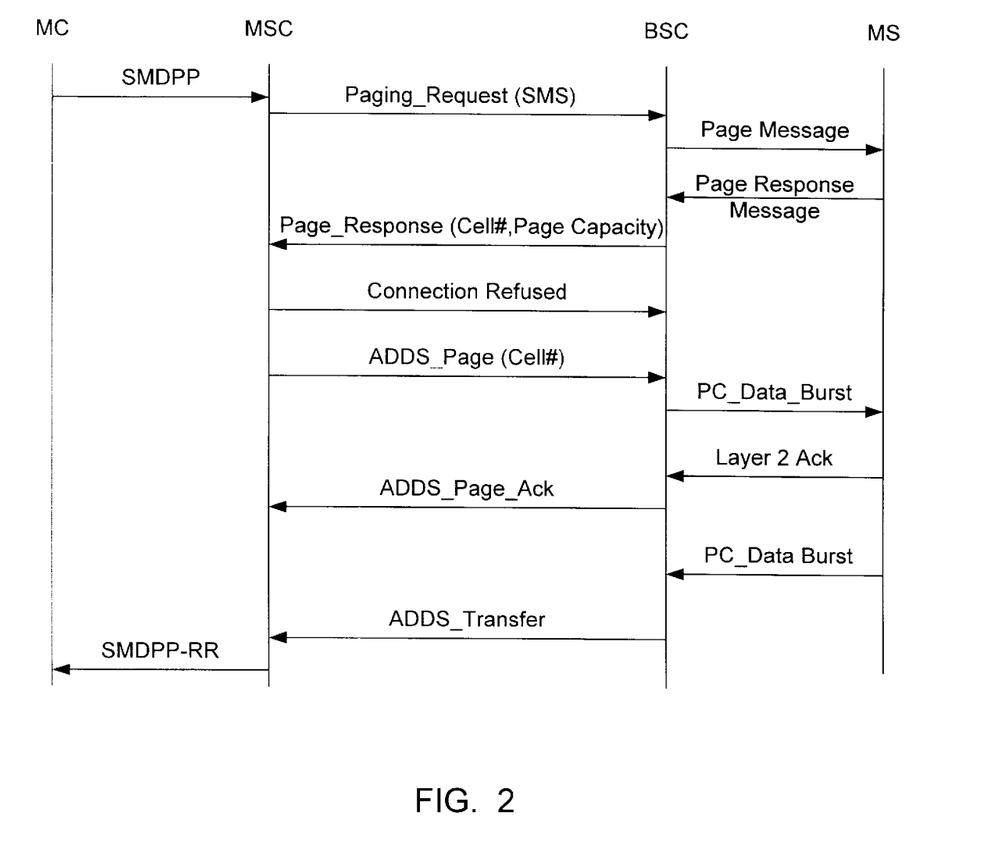
FIG. 2 is a message flow diagram for the delivery of an SMS message over the paging channel.
Figure 3:
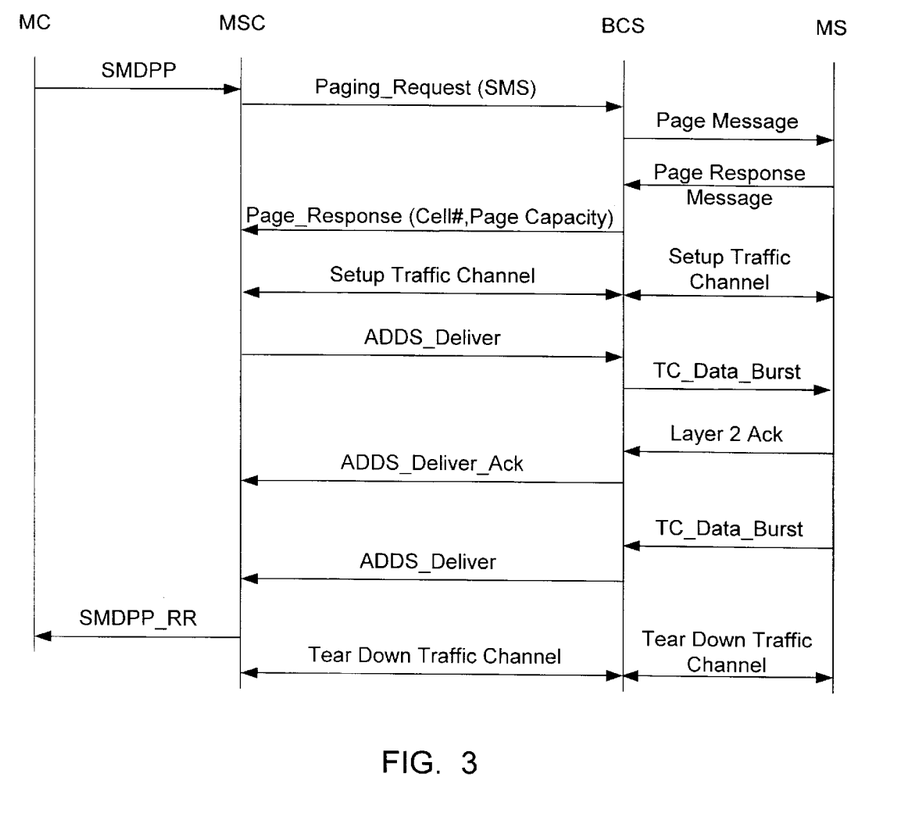
FIG. 3 is a message flow diagram for the delivery of an SMS message over the traffic channel.

A detailed description of how SMS messages are delivered to a mobile station in the system of FIG. 1 will be provided with reference to FIGS. 2 and 3. In FIG. 2, a message flow diagram for the delivery of short messages over the paging channel to an idle mobile is shown. In FIG. 3, a message flow diagram for the delivery of short messages over the traffic channel to an idle mobile is shown.

In these figures and their description, message names are in some cases taken from existing standards. For example, traffic channel messaging between the MSC and the BSC in either direction is done with ADDS_Deliver messages. Paging channel messaging from the MSC to the BSC is done with ADDS_Page messages and paging channel messaging from the BSC to the MSC is done with ADDS_Transfer messages. It is to be understood that depending upon the particular standard employed, different messages may be used to fulfill these functions.

Referring now to FIG. 2, the first step is for the MC to send an SMDPP (short message deliver point to point invoke) to the MSC. This includes the MIN (mobile identification number) and ESN (electronic serial number) of the mobile station to which a message is addressed, and also includes the actual text of the message, this being referred to as the SMS message payload. This SMDPP message may include other information as well. In response to this, the MSC sends a Paging_Request message with the SMS service option to all BSCs in the network in an effort to locate the relevant mobile station. The BSCs then send a page message to each of its cells controlled by that BSC over the air interface. The mobile responds with a page response to its BSC. The BSC which received the page response sends a Page_Response message to the MSC. The Page_Response message includes an identification of the cell the mobile station is in (cell #), an identification of the MIN and ESN of the mobile station which responded, and preferably includes the paging channel capacity for that cell.

When the MSC receives a Page_Response it verifies the MIN and ESN information before proceeding to ensure that it is a proper response. If the MIN and ESN in the Page_Response match that in the Paging_Request, then it is a proper response. The MSC then makes a determination of whether the SMS message payload will fit on the paging channel of the cell in which the MS is located. In the case that the Page_Response includes the paging channel capacity, this determination may be done on the basis of the size of the message payload in comparison with the capacity of the paging channel. The capacity of the paging channel may consist of the maximum page message handling capability, or may consist of the baud rate and maximum time duration of a page message for example.

In either case the maximum size of the message that a particular paging channel may handle is a function of the baud rate of the channel, and of the maximum time duration page permitted on the channel. Present paging channels typically operate at 4800 baud in which case SMS messages of up to about 23 characters may be handled, or 9600 baud in which case SMS messages of up to about 120 characters may be handled. Presumably, in the future, paging channel capacities will continue to increase and thus the size of SMS messages which may be handled by the paging channel will also increase.

If the correct mobile unit responded to the page, and the message payload will fit on the paging channel, the MSC builds an ADDS_Page message which will include the SMS message payload extracted wholly from the SMDPP and an identification of the cell number in which the mobile station is located. If the size of the message payload is greater than the paging channel capacity, then it must be delivered on the traffic channel. This is described in detail below with reference to FIG. 3.

The MSC then may send a connection refused message to the BSC indicating that no traffic channel is to be established. The MSC then sends the ADDS_Page message to the BSC which controls the cell that responded to the page. Upon receipt of the ADDS_Page message, the relevant BSC passes this to the basestation for the relevant cell which transmits a data burst message to the mobile station over the paging channel air interface. Contained within the data burst message is the SMS message payload originally included in the SMDPP.

There are many different schemes for transmitting an acknowledgement of the data burst from the MS through to the MC. What scheme is appropriate may depend upon the speed which the MS can generate an acknowledgement, or on the particulars of the paging protocols involved.

By way of example, in FIG. 2, the data burst is first acknowledged by the MS with a "layer 2 acknowledgement". This simply indicates that the MS received something, but does not indicate that the full message was necessarily received. The BSC may forward this to the MSC in the form of an ADDS_Page_Ack, again simply indicating that a page was received by the MS. Then, after receipt of the full message, the MS may send a data burst message to the BSC. The BSC simply forwards this to the MSC in the form of an ADDS_Transfer message, indicating to the MSC that the message was successfully delivered over the page channel. The MSC forwards this to the MC in the form of an SMDPP_RR (SMDPP return result) message which indicates that the message was successfully delivered, for example by including a "Non-fail" indication.

Referring now to FIG. 3, the steps involved in delivering a message to an idle mobile station over a traffic channel will be described. The first four steps are identical to those described with reference to FIG. 2, namely the appropriate transmission of a Paging_Request, page message, page response message, and Page_Response. In this case, the MSC has determined that there is insufficient capacity on the paging channel to handle the message. The MSC then proceeds with setting up a traffic channel to the relevant MS. Depending upon the underlying protocols, there are many different ways of setting up traffic channels, and the particular method used is not relevant to the invention. As such, the setting up of a traffic channel is shown in FIG. 3 as pair of bi-directional arrows between the MSC, BSC and MS, but it is to be understood that this may involve several discrete steps and message flows.

Next, the steps necessary for the actual delivery of the message are performed. The MSC first builds an ADDS_Deliver message, this being basically the same as an ADDS_Page message except that it is for transmission on a traffic channel instead of a paging channel. This is sent to the relevant BSC which then sends it over the previously established traffic channel as a traffic channel data burst.

As in the case of the paging channel delivery of the message, there are many ways to set up the acknowledgement of the traffic channel message. By way of example, an acknowledgement scheme which is similar to the paging example will be described. In response to the data burst, the mobile station sends a "layer 2 acknowledgement" and a data burst which respectively result in the BSC sending an ADDS_Deliver_Ack message and an ADDS_Deliver message to the MSC. Finally, the MSC sends an SMDPP_RR to the MS. This completes the delivery and acknowledgement of the message. All that is left to do is tear down the call. This is indicated again by pair of bi-directional arrows, and like the call setup arrows previously described, these tear down arrows may represent a number of steps and message flows depending upon the particulars of the protocols used.

Figure 4:
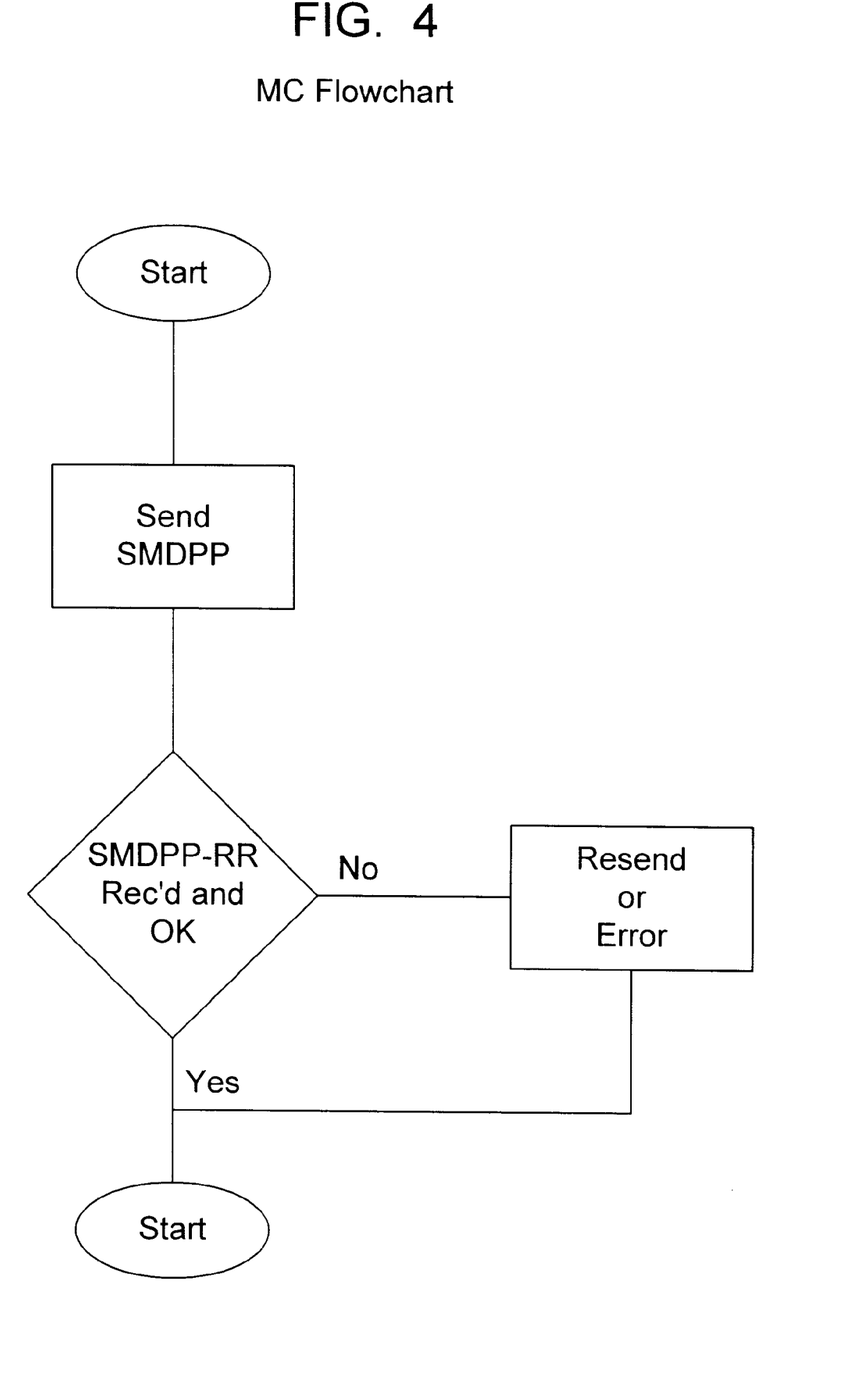
FIG. 4 is a flowchart for the SMS steps executed by the MC (message centre)

The steps executed by the MS are summarized in the flowchart of FIG. 4. All of the steps in this flowchart is appear as message flows in either FIG. 2 or FIG. 3.

Figure 5:
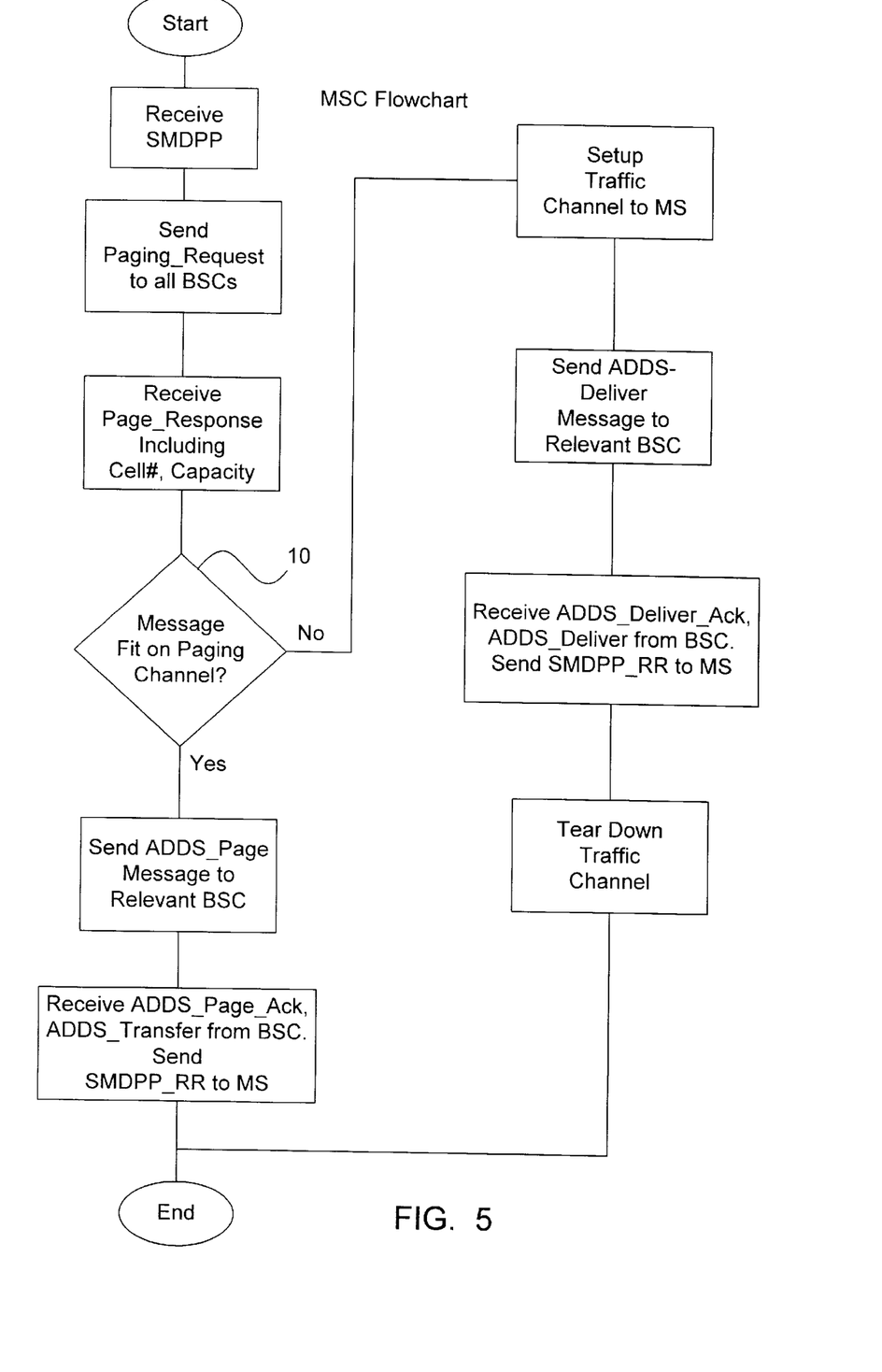
FIG. 5 is a flowchart for the SMS steps executed by the MSC (mobile switching centre)

The steps executed by the MSC are summarized in the flowchart of FIG. 5. All of the steps in this flowchart appear as message flows in either FIG. 2 or FIG. 3 with the exception of the conditional indicated by block 10 in which the determination of whether the message is to be sent on the paging channel or the traffic channel is made. Depending upon the outcome of this test, the message flow either continues as indicated in FIG. 2 for the case that the message will fit on the paging channel, or as indicated in FIG. 3 for the case that the message will not fit on the paging channel.

Figure 6:
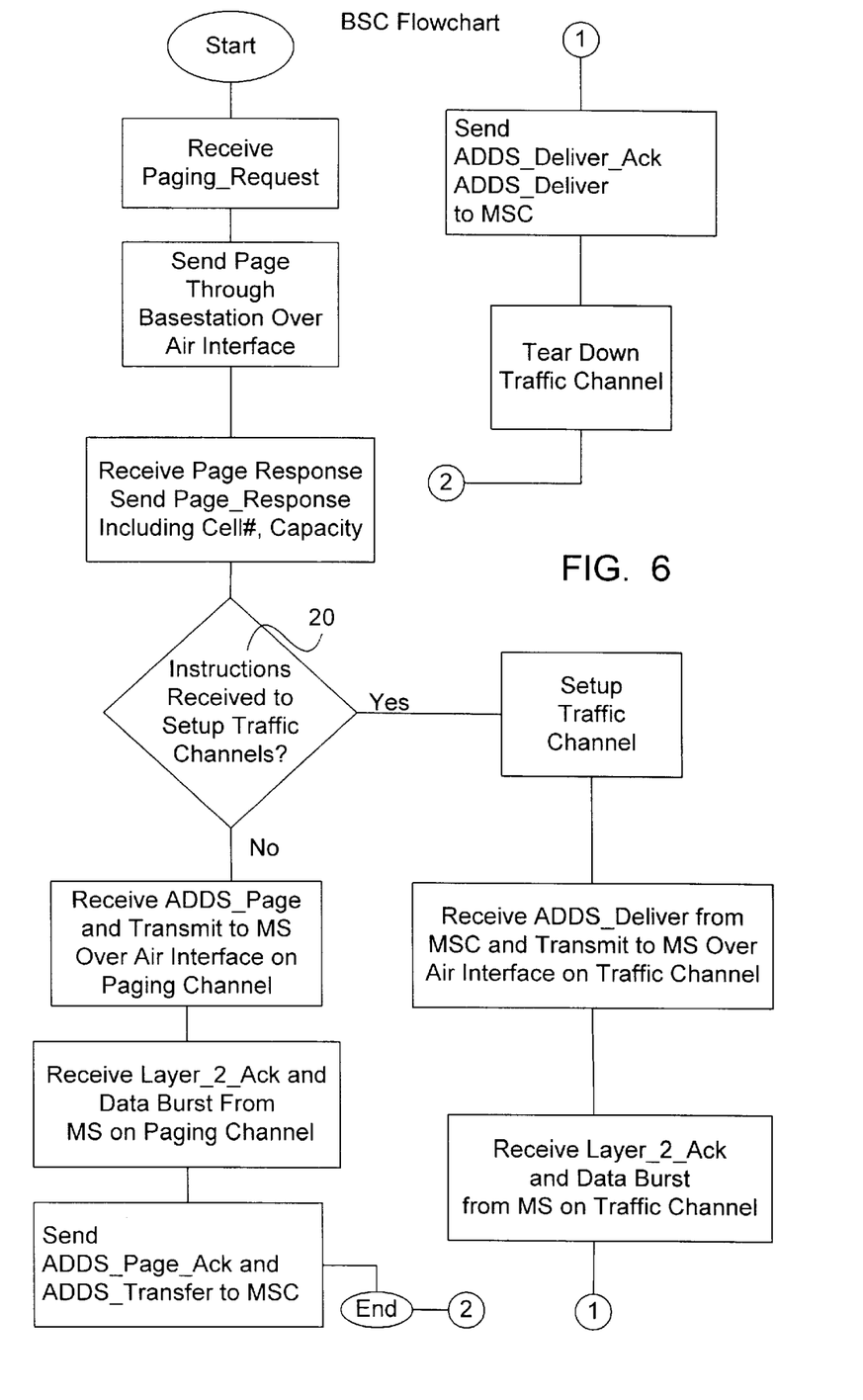
FIG. 6 is a flowchart for the SMS steps executed by the BSC (basestation controller).

The steps executed by the BSC are summarized in the flowchart of FIG. 6. All of the steps in this flowchart appear as message flows in either FIG. 2 or FIG. 3 with the exception of the conditional indicated by block 20 in instructions are either received or not for setting up a traffic channel. If no traffic channel is to be setup, then the flowchart continues with steps corresponding with messages in FIG. 2, while if a traffic channel is set up, then the flowchart continues with steps corresponding with messages in FIG. 3.

Numerous modifications and variations of the present invention are possible in light of the above teachings. It is therefore to be understood that within the scope of the appended claims, the invention may be practised otherwise than as specifically described herein.

In the above described embodiment, a decision as to whether to sent an SMS message on a paging channel or on a traffic channel is made by the MSC on the basis of a paging channel capacity received from the BSC for the cell in which the mobile station is located. Alternatively, the Page_Response message may not include the paging channel capacity in which case the MSC must make this determination on some other basis. For example, the MSC may impose a predefined message size limit for all cells above which the traffic channel is used, and below which the paging channel is used. Alternatively, the MSC may contain a table which has the paging channel capacity for each cell, and the MSC would make the channel decision with reference to the paging channel capacity for the cell in which the mobile station is located.

In the above described embodiments, there is a MSC-BSC-basestation-MS hierarchy. It may be that in some systems there is only a single component between the MSC and the MS. It is to be understood that in such cases, the single component may for the purpose of this description, be thought of as a basestation controller having control over a number of cells equalling one.

What is claimed is:

1. A system for delivering a short message addressed to a particular mobile station comprising:

a message centre initially having access to the short message;

a mobile switching centre in communication with the message centre;

a plurality of basestation controllers connected to the mobile switching centre, each providing mobile communications service to a respective number of cells, each cell having a paging channel;

wherein the short message is sent by the message centre to the mobile switching centre which broadcasts a page to all of the cells so as to determine the cell in which is located the mobile station to which the short message is addressed, and after determining the cell, the mobile switching centre passes the short message to the basestation controller for that cell, and the basestation controller for that cell transmits the short message to the mobile station;

wherein in determining the cell in which is located the mobile station, a determination of the cell's paging channel capacity is also made, and this paging channel capacity is sent to the mobile switching centre which determines whether the paging channel capacity is sufficiently large to handle the message, and if so sends the message over the paging channel, and if not sets up a traffic channel to the mobile station and sends the message over the traffic channel.

2. A system according to claim 1 wherein the message is sent over the paging channel.

3. A method of delivering a short message to a mobile station in a system comprising a message centre, a mobile switching centre controlling a plurality of basestation controllers, each basestation controller having a respective number of cells, each cell having a paging channel, the method comprising:

the message centre sending the message to the mobile switching centre;

the mobile switching centre broadcasting a page through all basestation controllers under its control;

a particular basestation controller receiving a response from the mobile station and sending a page response to the mobile switching centre indicating the particular cell in which the mobile station is located;

the mobile switching centre sending the short message to the particular basestation controller;

the particular basestation controller sending the short message to the mobile station;

wherein the particular basestation controller includes a paging channel capacity for the cell in which the mobile station is located in the response to the mobile switching centre, and the mobile switching centre determines if the paging channel capacity is sufficient to handle the message; in the case that the paging channel capacity is sufficient the mobile switching centre sends the message to the mobile station over the particular cell's paging channel, and in the case that the paging channel capacity is insufficient the mobile switching centre sets up a traffic channel to the mobile station through the particular basestation controller and sending the message over the traffic channel.

4. A method according to claim 3 wherein the message is sent to the mobile station over the particular cell's paging channel.

5. A method of delivering a short message to a mobile station in a system comprising a message centre, a mobile switching centre controlling a plurality of basestation controllers, each basestation controller having a respective number of cells, each cell having a paging channel, the method comprising:

the message centre sending the message to the mobile switching centre; p1 the mobile switching centre broadcasting a page through all basestation controllers under its control;

a particular basestation controller receiving a response from the mobile station and sending a page response to the mobile switching centre indicating the particular cell in which the mobile station is located;

the mobile switching centre sending the short message to the particular basestation controller;

the particular basestation controller sending the short message to the mobile station;

wherein:

the step of the mobile switching centre broadcasting a page through all basestation controllers under its control comprises the steps of:
i) the mobile switching centre sending a paging request message with a short message service option to each of the basestation controllers;
ii) each basestation controller instructing a basestation in each of its cells to transmit a page message over the basestation's respective air interface.

6. A method according to claim 5 further comprising the steps of:

the mobile switching centre making a decision of whether to send the message over a paging channel or a traffic channel;

in the case that the message is to be sent over the paging channel, the mobile switching centre sending a connection refused message to the particular basestation controller after receipt of the page response, and the mobile switching centre sending the message over the paging channel;

in the case that the message is to be sent over the traffic channel, the mobile switching centre setting up a traffic channel to the mobile station through the particular basestation controller, and the mobile switching centre sending the message over the traffic channel.

7. A method according to claim 6 wherein the step of the particular basestation controller receiving a response from the mobile station and sending a page response to the mobile switching centre indicating the cell in which the mobile station is located further comprises the step of including in the response the paging channel capacity for the particular cell;

wherein the paging channel capacity is used as a basis for determining whether the short message should be sent over the paging channel or over a traffic channel.

8. A method according to claim 3 wherein the step of the particular basestation controller sending the message to the mobile station comprises sending the message to a basestation located in the particular cell, and the basestation transmitting a data burst containing the message over the air interface.

9. A mobile switching centre method comprising the steps of:

receiving a short message including an address of a mobile station to which the short message is addressed;

sending a page to its entire service area;

receiving a message in response to the page indicating a cell in which the mobile station is located;

sending the short message to a basestation serving the cell;

wherein the message in response to the page includes a paging channel capacity for the cell, the method further comprising the steps of:

determining if the paging channel capacity is sufficient to handle the short message;

wherein in the case that the paging channel capacity is sufficient, the step of sending the short message to the mobile station is done through the paging channel;

and wherein in the case the paging channel capacity is insufficient, the method further comprises the step of setting up a traffic channel to the mobile station, and the step of sending the short message to the mobile station is done through the traffic channel.

10. A mobile switching centre method comprising the steps of:

receiving a short message including an address of a mobile station to which the short message is addressed;

sending a page to its entire service area;

receiving a message in response to the page indicating a cell in which the mobile station is located;

sending the short message to a basestation serving the cell;

wherein the message in response to the page includes a paging channel capacity for the cell, the method further comprising the steps of:

determining if the paging channel capacity is sufficient to handle the short message;

wherein in the case that the paging channel capacity is sufficient, the step of sending the short message to the mobile station is done through the paging channel;

and wherein in the case the paging channel capacity is insufficient, the method further comprises the step of setting up a traffic channel to the mobile station, and the step of sending the short message to the mobile station is done through the traffic channel;

further comprising the step of sending an acknowledgement message to a source of the message indicating that the message was successfully delivered.

11. A method of sending an information message to an idle mobile station comprising:

broadcasting a broadcast message to a plurality of cells in which the mobile station might be located;

receiving an acknowledgement of the broadcast message identifying a particular cell in which the mobile station is located;

determining a paging channel capacity of the particular cell;

transmitting the information message in the particular cell on a paging channel if the paging channel capacity is sufficient;

setting up a traffic channel and transmitting the information message on a traffic channel if the paging channel capacity is insufficient.

12. A method according to claim 11 wherein the broadcast message is sent over a paging channel.

13. A mobile switching centre operable to implement the method of claim 9.

14. A mobile switching centre operable to implement the method of claim 10.

* * * * *